US005609543A

United States Patent [19]
Aoki et al.

[11] Patent Number: 5,609,543
[45] Date of Patent: Mar. 11, 1997

[54] CLUTCH OPERATIONAL CONTROL APPARATUS

[75] Inventors: Takashi Aoki, Fujimi; Masahiro Kanda, Matsuyama; Takahiro Matsuda, Hiki-gun; Keisuke Katsuta, Kawagoe, all of Japan

[73] Assignee: Honda Giken Kogyo Kabushiki Kaisha, Tokyo, Japan

[21] Appl. No.: 388,019

[22] Filed: Feb. 14, 1995

[30] Foreign Application Priority Data

Feb. 17, 1994 [JP] Japan ................................. 6-043220

[51] Int. Cl.$^6$ ................................. F16D 25/062
[52] U.S. Cl. ................................. 477/45; 477/74
[58] Field of Search ................................. 477/40, 44, 45, 477/50, 74, 92, 114, 116, 173, 175, 176

[56] References Cited

U.S. PATENT DOCUMENTS

| | | | |
|---|---|---|---|
| 4,653,621 | 3/1987 | Oshiage | 477/175 |
| 4,735,113 | 4/1988 | Yamamuro et al. | 477/45 X |
| 5,275,267 | 1/1994 | Slicker | 477/176 |
| 5,439,425 | 8/1995 | Ramm et al. | 477/74 |

FOREIGN PATENT DOCUMENTS

| | | |
|---|---|---|
| 60-245838 | 12/1985 | Japan . |
| 62-216842 | 9/1987 | Japan . |

OTHER PUBLICATIONS

English language Abstracts of JP 60-245838 and JP 62-216842.

Primary Examiner—Charles A. Marmor
Assistant Examiner—Saul Rodriguez
Attorney, Agent, or Firm—Lyon & Lyon

[57] ABSTRACT

A clutch operational control apparatus (75) controls an engaging force of a starting clutch (5) which is provided in a power transmitting path including an automatic transmission (CVT). The control apparatus comprises an idling state detector of an engine, a vacuum pressure detector for detecting an actual intake vacuum pressure of the engine, a range judging unit for judging a shift position of a manual shift lever, a target intake vacuum pressure determining unit for determining a target intake vacuum pressure, and clutch engaging force control means for controlling the clutch engaging force. The target intake vacuum pressure determining unit determines the target intake vacuum pressure based on the actual intake vacuum pressure when it is judged that the shift position is in the non-driving range and further when it is detected that said engine is in the idling state. The clutch engaging force control means controls the clutch engaging force so that the actual intake vacuum pressure coincides with the target intake vacuum pressure when it is judged that the shift position is in the driving range and further when it is detected that the engine is in the idling state.

10 Claims, 7 Drawing Sheets

CLUTCH OPERATIONAL CONTROL APPARATUS

BACKGROUND OF THE INVENTION

1. Field of the Invention

The present invention relates to a clutch operational control apparatus used for automatically controlling the connection and disconnection of power transmitting paths between an engine and road wheels. It particularly relates to an operational control apparatus for a clutch which is provided in the power transmitting path of an vehicular automatic transmission.

2. Related Prior Arts

When a driving range shift position is selected in an vehicular automatic transmission, the clutch is engaged to transmit the engine power to the wheels. When the accelerator is fully closed (or an accelerator pedal is fully released) and the vehicle brake is released, the clutch is still engaged in the driving range to transmit some degree of the engine power (so-called the creep power) to the wheels, thereby allowing the vehicle to move slowly (to allow a creeping movement). The creeping movement enables a driver to easily maneuver the vehicle when driving the vehicle to park by a curb or into a garage.

However, when the vehicle brake is applied, the creeping force should be made as small as possible to avoid an unfavorable vibration of the vehicle and to improve the fuel consumption of the engine. From these view points, a control apparatus to control the creeping force based on the braking operation (the degree of the depression in the brake pedal) is disclosed in Japanese Laid-open Patent Publication No.62-216842. In the control unit, an engaging force of a clutch is so controlled as to correspond with a reference value which is set based on the braking operation. Accordingly, when the brake pedal is released, the engaging force of the clutch is increased, thereby transmitting a normal (or strong) creep force through the clutch. When the brake pedal is slightly depressed, the engaging force is decreased, thereby transmitting a weak creep force. Further, when the brake pedal is strongly depressed, the clutch is released to make the engaging force zero, thereby transmitting no creep force. In a control apparatus disclosed in Japanese Laid-open Patent Publication 60-245838, when a brake is applied, the engine idling speed is decreased to a specified low speed to decrease a creep force. The specified low speed corresponds to the engine idling speed which is set at a neutral range.

However, in the case of the control apparatus disclosed in Japanese Laid-open Patent Publication No.62-216842, the transmitted force to the wheels varies as a coefficient of friction in the clutch lining varies even if the clutch engaging force is kept unchanged. As a result, it is difficult to obtain a stable creep force. Particularly, it is difficult to obtain a low and stable creep force. In order to obtain a low and stable creep force, it is quite necessary to control the clutch engaging force accurately so as to coincide with a reference value. However, the outputs from sensors (such as pressure sensors) will always include a certain amount of errors. These errors may have a significant influence on the control of the clutch engaging force particularly when the required creep force is low. Accordingly, it is difficult to control the clutch engaging force accurately to obtain a low and stable creep force.

If the clutch engaging force is decreased to zero when the brake pedal is depressed, a clutch disk is fully moved to a disengaging position by a biassing force of a return spring in the clutch. Then, when the brake pedal is released and the accelerator pedal is depressed to accelerate the vehicle, the clutch disk must move from the disengaging position to an engaging position. The time required to move the clutch disk from the disengaging position to the engaging position may produce a lag before the clutch actually begins to engage. Since the engine speed can be increased rapidly under a disengaged condition of the clutch, a jerky engagement of the clutch may happen.

In the control apparatus disclosed in Japanese Laid-open Patent Publication 60-245838, the clutch engaging force is controlled using the engine idling speed as a reference value. However, since the engine idling speed does not always correspond with the engine load, it is difficult to control the creep force accurately. Otherwise, a complicated control is requires.

SUMMARY OF THE INVENTION

It is an object of the present invention to provide a clutch operational control apparatus by which a low and stable creep force can be obtained easily.

In order to obtain that object, the clutch operational control apparatus according to the present invention comprises idling state detecting means for detecting whether said engine is in an idling state or not, vacuum pressure detecting means for detecting an actual intake vacuum pressure of said engine, range judging means for judging whether a shift position of a manual shift means is in a driving range or at a non-driving range, target intake vacuum pressure determining means for determining a target intake vacuum pressure based on the actual intake vacuum pressure when it is judged that the shift position is in the non-driving range and further when it is detected that the engine is in the idling state, and clutch engaging force control means for controlling the clutch engaging force so that the actual intake vacuum pressure coincides with the target intake vacuum pressure when it is judged that the shift position is in the driving range and further when it is detected that the engine is in the idling state.

The target intake vacuum pressure determining means may determine the target intake vacuum pressure by subtracting a specified value from the actual intake vacuum pressure. The actual intake vacuum pressure will be detected immediately before the shift from the non-driving range to the driving range.

The clutch engaging force control means may control the clutch engaging force for a specified time period at first so that the actual intake vacuum pressure coincides with the target intake vacuum pressure, and then the clutch engaging force is kept constant at a value determined at the end of said time period.

The clutch operational control apparatus according to the present invention can further include braking operation detecting means for detecting whether a vehicle brake is applied or not, and creep-mode selection means for selecting a first creep-mode when it is judged that the shift position is at the driving range and further when it is detected that said vehicle brake is not applied, and for selecting a second creep-mode when it is judged that the shift position is at the driving range and further when it is detected that said vehicle brake is applied. The creep force transmitted through the clutch is larger in the first creep-mode than in the second creep-mode. The clutch engaging force control means controls the clutch engaging force so that the actual intake vacuum pressure coincides with the target intake vacuum pressure when the second creep-mode is selected.

When the second creep-mode is selected, the clutch engaging force control means controls the clutch engaging force for a specified time period at first so that the actual intake vacuum pressure coincides with the target intake vacuum pressure, and then the clutch engaging force is kept constant at a value determined at the end of said time period.

When the first creep-mode is selected, the clutch engaging force control means controls the clutch engaging force so as to coincide with a predetermined engaging force. The predetermined engaging force is determined by adding a specified value to the engaging force which is determined in the second creep-mode.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Figure 1:
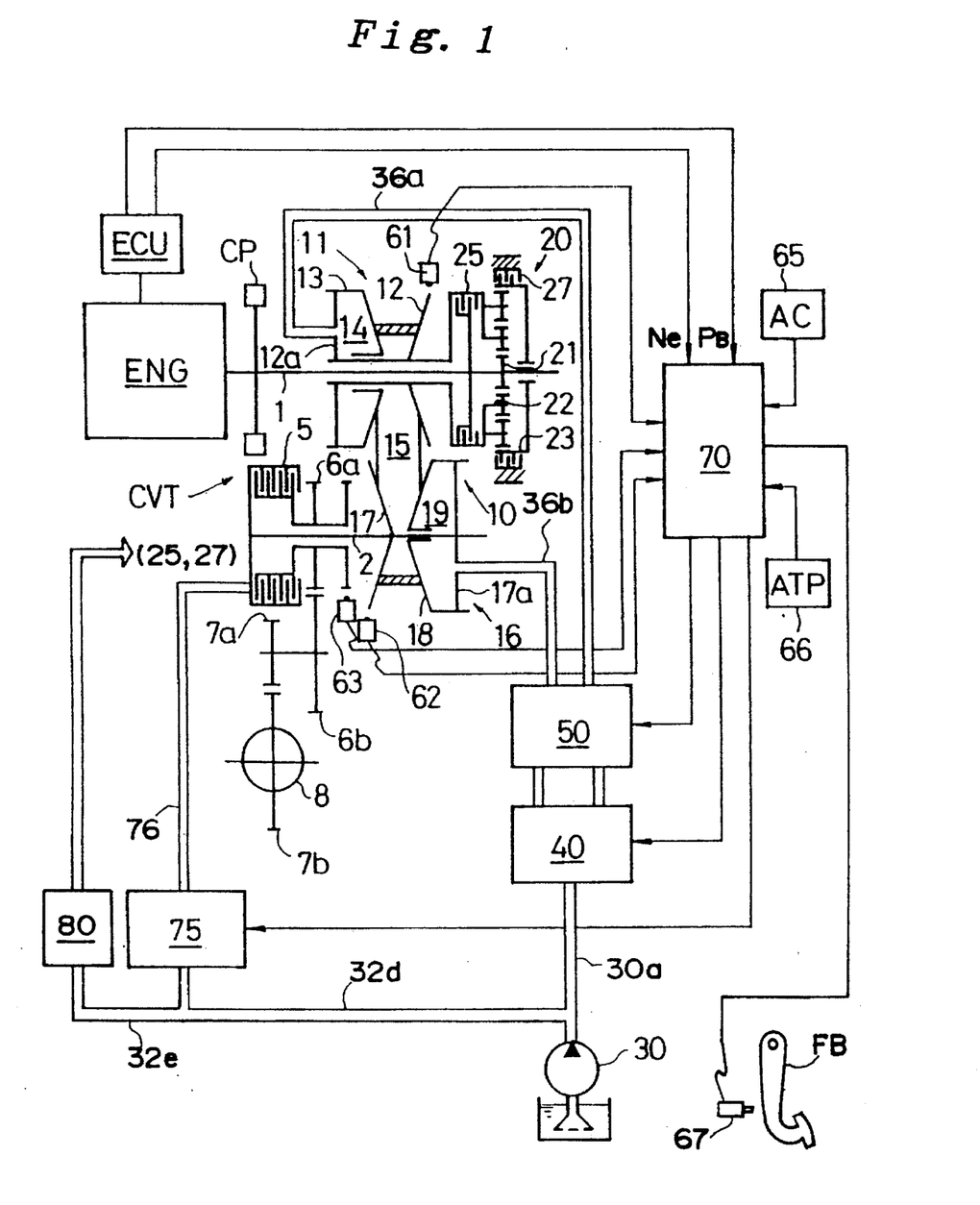
FIG. 1 is a schematic view of the control apparatus according to the present invention and a power transmitting unit including the control apparatus.

A belt-type continuously variable transmission CVT having a control apparatus according to the present invention is schematically shown in FIG.1. The belt-type continuously variable transmission comprises a metallic V-belt mechanism 10 disposed between an input shaft 1 and a counter shaft 2, a planetary-gear forward-reverse selector mechanism 20 disposed between the input shaft 1 and a drive pulley 11, and a starting clutch 5 disposed between the counter shaft 2 and an output member (a differential mechanism 8, for example). The continuously variable transmission CVT is suitable for use as a motor vehicle transmission. The input shaft 1 is connected with an engine ENG output shaft through a coupling mechanism CP. The differential mechanism 8 is connected with right and left wheels (not shown).

The metallic V-belt mechanism 10 comprises the drive pulley 11 mounted on the input shaft 1, a driven pulley 16 mounted on the countershaft 2, and a metallic V-belt 15 trained over the drive and driven pulleys 11,16.

The drive pulley 11 comprises an axially fixed pulley member 12 rotatably mounted on the input shaft 1, and a pulley member 13 axially movable relatively to the fixed pulley member 12. The pulley member 13 has a cylinder chamber 14 defined axially laterally thereof by a cylinder wall 12a coupled to the axially fixed pulley member 12. When a hydraulic pressure is supplied to the cylinder chamber 14, it generates a lateral force for moving the pulley member 13 axially toward the fixed pulley member 12.

The driven pulley 16 comprises a fixed pulley member 17 fixedly mounted on the countershaft 1, and a pulley member 18 axially movable relatively to the fixed pulley member 17. The pulley member 18 has a cylinder chamber 19 defined axially laterally thereof by a cylinder wall 17a coupled to the fixed pulley member 17. When a hydraulic pressure is supplied to the cylinder chamber 19, it generates a lateral force for moving the pulley member 18 axially toward the fixed pulley member 17.

Control of the hydraulic pressures (the pulley control hydraulic pressures) supplied to the cylinder chambers 14,19 enables the control of the thrust forces applied to the V-belt 15 so as not to allow slippage thereof. The control of the pulley control hydraulic pressure also enables the control of the pulley width of the pulleys 11,16 to change the diameters of circles around which the V-belt 15 is trained on the pulleys 11,16 for continuously varying the speed ratio.

The planetary-gear forward-reverse selector mechanism 20 comprises a sun gear 21 coaxially coupled to the input shaft 1, a carrier 22 coupled to the fixed pulley member 12, a ring gear 23 that can be held against rotation by a reverse brake 27, and a forward clutch 25 capable of connecting the sun gear 21 and the ring gear 23 to each other. When the forward clutch 25 is engaged, the sun gear 21, the planet gears on the carrier 22, and the ring gear 23 rotate in unison with the input shaft 1, causing the drive pulley 11 to rotate in the same direction as the input shaft 1 (forward direction). When the reverse brake 27 is engaged the ring gear 23 is held against rotation, and hence the carrier 22 is rotated in a direction opposite to the sun gear 21, so that the drive pulley 11 rotates in a direction opposite to the input shaft 1 (reverse direction).

Further, when both the forward clutch 25 and the reverse brake 27 are disengaged, no power is transmitted through the forward-reverse selector mechanism 20 to disconnect the engine ENG from the drive pulley 11.

The starting clutch 5 serves to allow the power to be transmitted from, or to prevent the power from being transmitted from, the countershaft 2 to the output member. When the starting clutch 5 is engaged, it connects the countershaft 2 to the output member, allowing the power to be transmitted from the countershaft 2 to the output member. Therefore, when the starting clutch 5 is engaged, the output power of the engine ENG is transmitted, at a speed ratio determined by the metallic V-belt mechanism 10 and pulleys 11, 16, from the countershaft 2 through meshing gears 6a,6b,7a,7b to the differential mechanism 8, from which it is divided and transmitted to the right and left wheels. When the starting clutch 5 is disengaged, no such engine output power can be transmitted, and hence the transmission is in a neutral condition.

The control apparatus for controlling the above belt-type continuously variable transmission is described hereinafter. The control apparatus comprises a group of regulator valves 40 by which pulley control hydraulic pressures to be supplied to the drive and driven cylinder chambers 14,19 are generated, a group of speed-ratio control valves 50 by which the supply of the pulley control hydraulic pressures to the cylinder chambers 14,19 are controlled, a clutch control valve 75 by which the starting clutch 5 is operationally controlled, and a manual valve 80 which is operationally controlled in response to the operation of a manual shift lever (not shown).

The regulator valve group 40, the speed-ratio control valve group 50 and the clutch control valve 75 respectively include linear solenoid valves and can exert hydraulic pressures corresponding to electric currents supplied to these valves. They are controlled based on electric signals sent from a controller 70. Electric signals corresponding to the engine rotational speed Ne and the engine intake vacuum pressure $P_B$ are sent from an engine control unit ECU to the controller 70. Electric signals corresponding to the rotational speeds of the drive pulley 11, the driven pulley 16 and the gear 6a which are respectively detected by first to third speed sensors 61,62,63 are sent to the controller 70. A detection signal from an air-conditioner sensor 65 which detects whether an air-conditioner AC is operated or not is also sent to the controller 70. Further, a shift-range position signal from a shift-range detector 66 which detects the shift-range based on the position ATP of a manual shift lever (or the position of a spool of a manual valve 80) is sent to the controller 70. An electric signal from a brake operation detector 67 which detects a depression of a foot-brake FB is sent to the controller 70.

Figure 2:
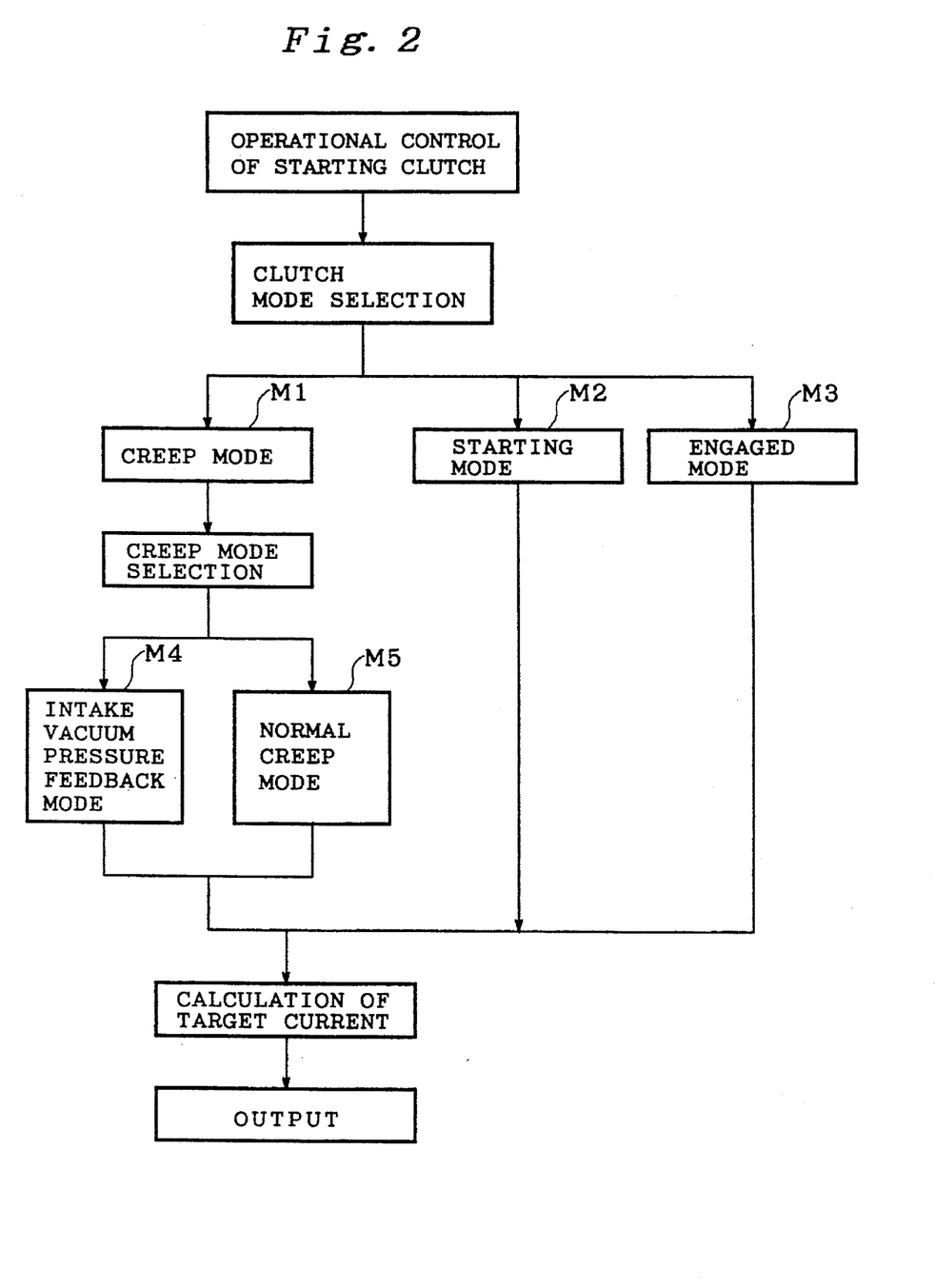
FIG. 2 is a flow chart showing a clutch control by the control apparatus.

Next, the operational control (the electric supply control to the solenoid) of the clutch control valve 75, namely the operational control of the starting clutch 5 is described by referring to FIG.2.

The operational control of the starting clutch 5 comprises a creep mode M1, a starting mode M2 and a engaged mode M3. The creep mode M1 is carried out when the engine ENG rotates at an idling speed and the vehicle speed is zero or very low. The starting mode M2 is carried out while the vehicle is being started (when the accelerator is opened and the vehicle speed is zero or very low). The engaged mode M3 is carried out when the vehicle is under a normal running condition.

The creep mode M1 further comprises an intake vacuum pressure feedback mode (or a first creep mode) M4 and a normal creep mode (or a second creep mode) M5. These modes M4 and M5 are selected in accordance with a flow chart shown in FIG.3. In the flow, at first it is decided whether the shift position of the manual shift lever is in D-range (running range) or not at Step S1. If it is not in D-range (or it is in N or P-range which is called non-running range), the control is proceeded to Step S6. If it is in D-range, the control goes to Step S2.

Figure 3:
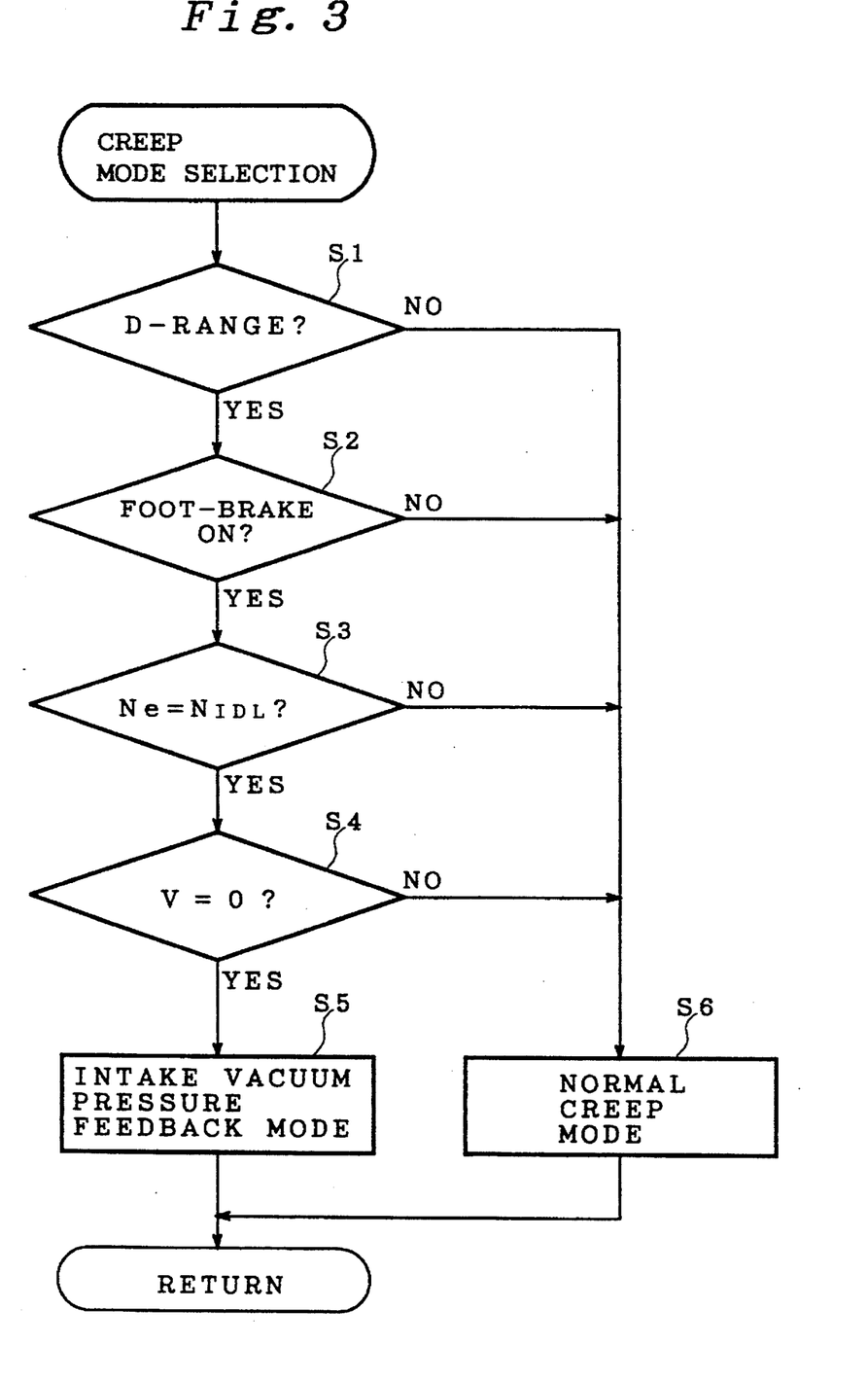
FIG. 3 is a flow chart showing a mode selection control.

It is judged whether the foot-brake FB is on or off (or depressed or not) at Step S2. If it is off, the control goes to Step S6. If it is on, the control goes to Step S3. At Step S3, it is judged whether the engine rotational speed Ne is driven at an idling speed $N_{IDL}$ or not. If NE=$N_{IDL}$, the control goes to Step S6. If NE=$N_{IDL}$, the control goes to Step S4. The idling speed $N_{IDL}$ is differently determined based on the operation of the air-conditioner. At Step S4, it is judged whether the vehicle speed V is zero or not (or the vehicle is halted or not). If V=0, the control goes to Step S5. If V>0, the control goes to Step S6.

The intake vacuum pressure feedback mode M4 is carried out at Step S5. A control flow based on the pressure feedback mode M4 is shown in detail in FIG.4. The control is described referring FIG.4. At Step S11, a plurality of data values of the intake vacuum pressure $P_B$ which are detected immediately before the shift from N or P-range to D-range (which are detected while a non-running range is selected and the engine rotates at an idling speed) are read. The average value of the data is memorized as a prior intake vacuum pressure $P_{BP}$. Then at Step S12, the time Ts during which a non-running shift position has been selected is detected. Further, it is judged at Step S12 whether the time Ts is greater than or equal to a specified time T1 or not, i.e. it is judged whether the prior intake vacuum pressure $P_{BP}$ is at a stable condition or not. If Ts<T1, the control goes to Step S13. At Step 13, a predetermined initial value for a target engaging operational pressure Pc is memorized and outputted. Then the control returns to Step 11 again. If Ts>or=T1, the control goes to Step S14.

Figure 4:
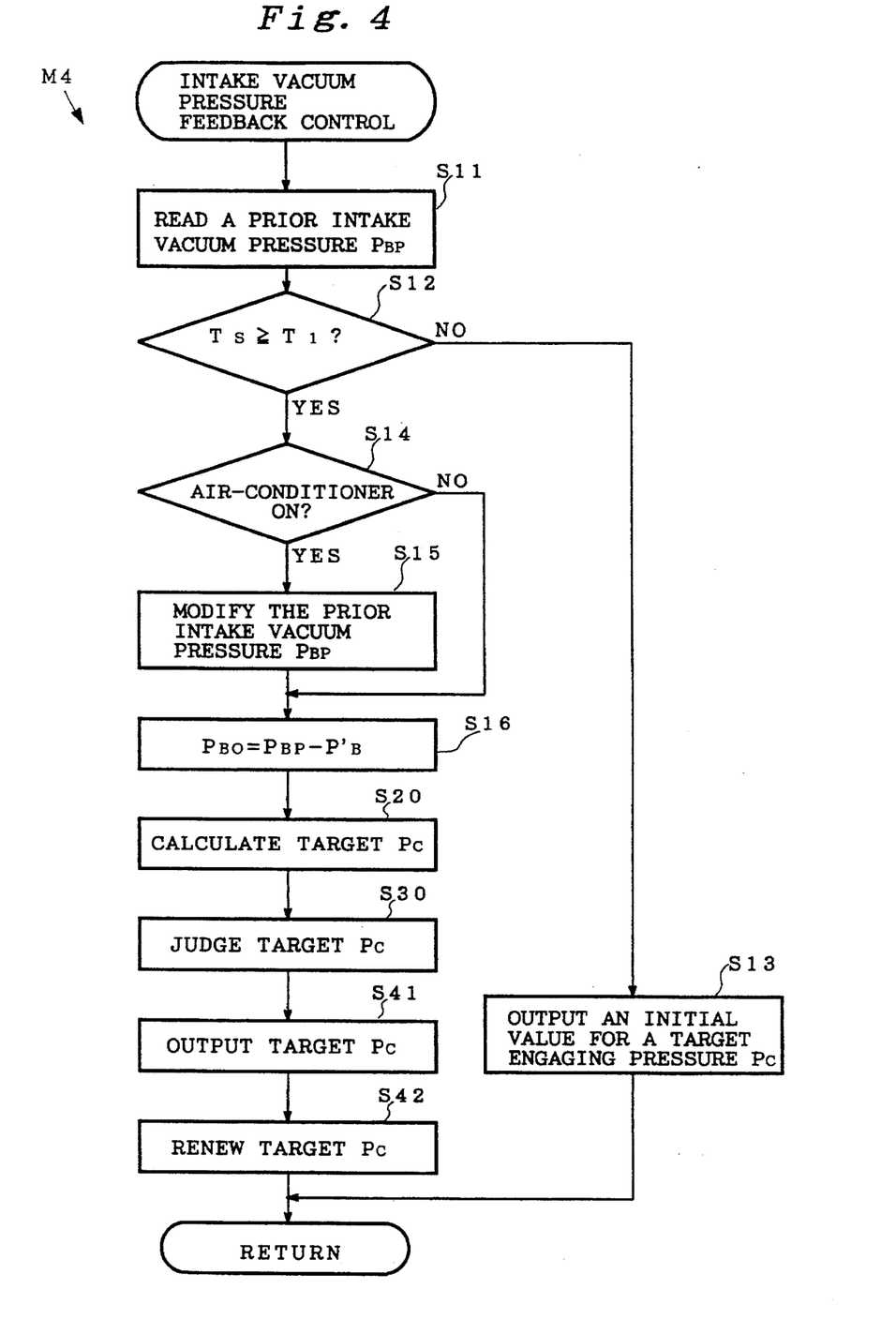
FIG. 4 is a flow chart showing a intake vacuum pressure feedback control.

It is judged at Step S14 whether the air-conditioner is on (operated) or not. If it is on, the control goes to Step S15 and then goes to Step S16. If it is off, the control goes to Step S16 directly. At Step S15, the prior intake vacuum pressure $P_{BP}$ is modified by subtracting a modification pressure from the prior intake vacuum pressure. The modification pressure is a pressure corresponding to the engine load required to operate the air-conditioner.

At Step S16, a target intake vacuum pressure $P_{BO}$ is calculated based on the prior intake vacuum pressure $P_{BP}$. As a matter of fact, if the air-conditioner is not operated (or is off), the target intake vacuum pressure $P_B$ is calculated by subtracting a weak-creep vacuum pressure $P_B$, from the prior intake vacuum pressure $P_{BP}$ (which is not modified at Step S15). The weak-creep vacuum pressure $P_B$, corresponds to an engine load required to produce a specified weak creep force. If the air-conditioner is operated (or on), the target intake vacuum pressure $P_{BO}$ is calculated by subtracting a weak-creep vacuum pressure $P_B$, from the modified prior intake vacuum pressure $P_{BP}$ (which is modified at Step S15). Then the control goes to Step S20.

Figure 5:
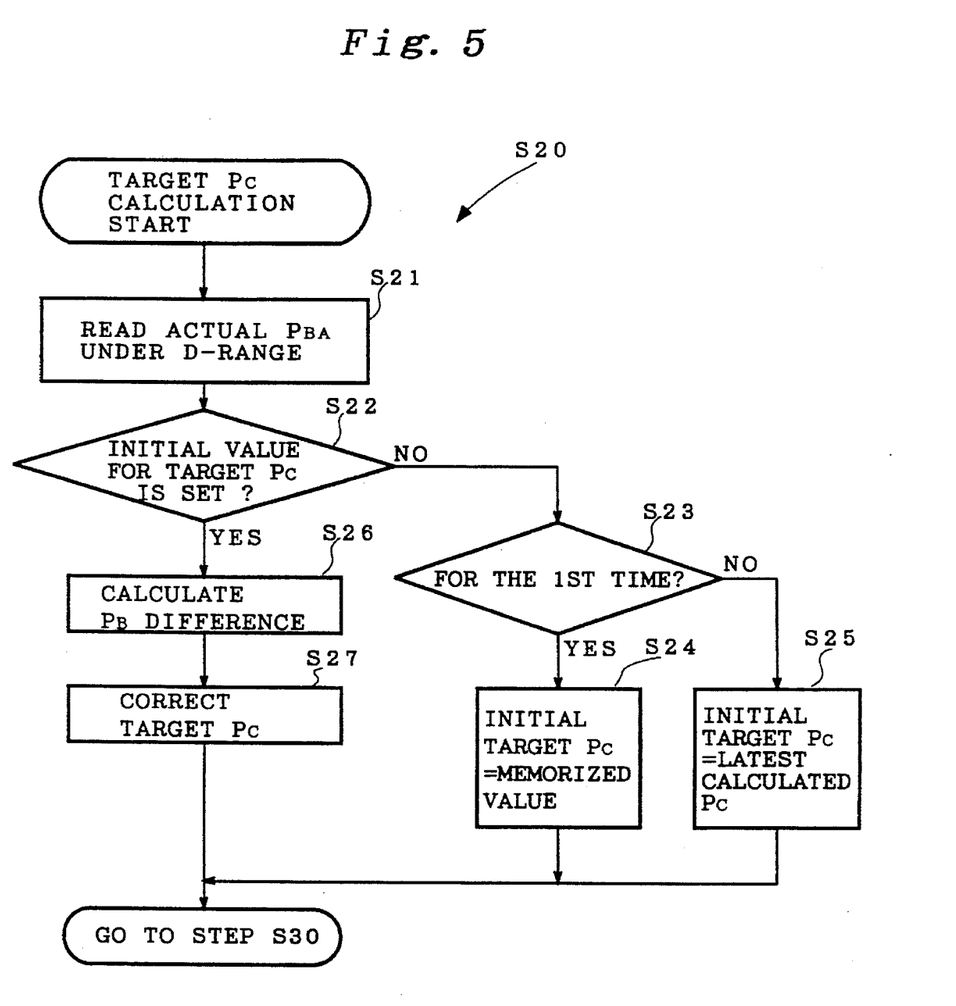
FIG. 5 is a flow chart showing a target Pc calculation.

At Step S20, the target engaging operational pressure Pc by which an actual intake vacuum pressure $P_{BA}$ is varied so as to approach the target intake vacuum pressure $P_{BO}$ is calculated. The calculation flow of the target engaging operational pressure Pc is shown in FIG.5. In this flow, the actual intake vacuum pressure $P_{BA}$ is read at Step S21 after shifted to D-range. Then, it is judged at Step S22 whether an initial value for the target engaging operational pressure Pc is set or not. If it is not set yet, the control goes to Step S23. If it is already set, the control goes to Step 26. At Step 23, it is judged whether the control under the intake vacuum pressure feedback mode M4 through Step S20 is carried out for the first time or not. If the control under the feedback mode M4 is carried out for the first time, the memorized initial value at Step S13 is set as an initial value for the target engaging operational pressure Pc (at Step S24). If the control under the feedback mode M4 has been carried out two or more times, the latest calculated value of the target engaging operational pressure Pc in the former intake vacuum pressure feedback mode M4 is set as an initial value (at Step S25).

At Step S26, a difference between the actual intake vacuum pressure $P_{BA}$ read at Step S21 and the target intake vacuum pressure $P_{BO}$ is calculated. Then, a feedback control of the target engaging operational pressure Pc to minimize the difference is carried out at Step 27, and then the control goes to Step S30.

Figure 6:
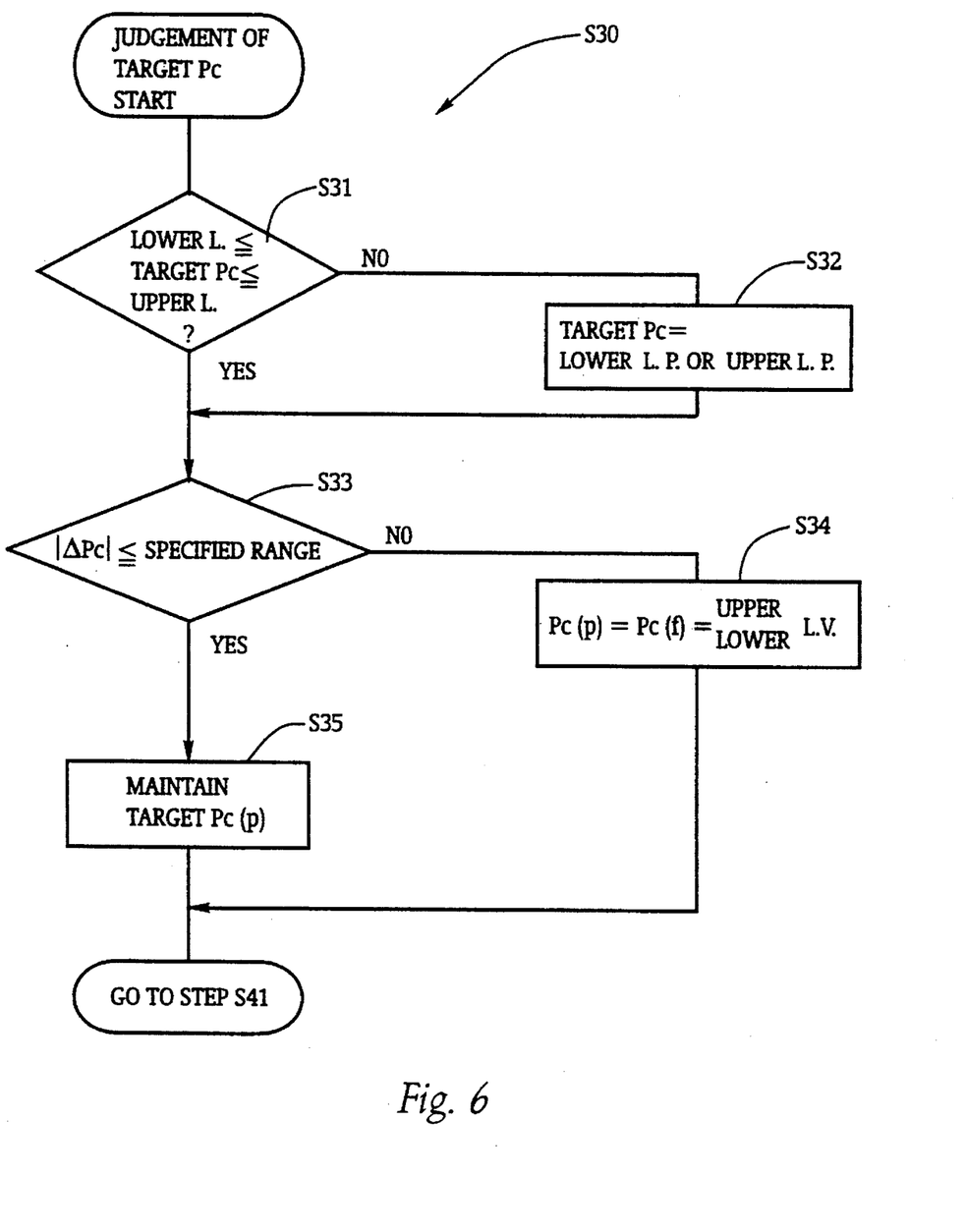
FIG. 6 is a flow chart showing a target Pc decision.

At Step S30, it is judged whether the target engaging operational pressure Pc calculated at Step S20 is within a reasonable range or not. This flow of Step S30 is shown in FIG.6. In this flow, it is judged at Step S31 whether the target engaging operational pressure Pc is within a range between a predetermined lower limit pressure and a predetermined upper limit pressure. If the pressure Pc is within the range, the control goes to Step S33. If the pressure Pc is out of the range, control goes to Step S32. When the pressure Pc is higher than the upper limit pressure, the pressure Pc is corrected for the upper limit pressure (at Step S32). When the pressure Pc is lower than the lower limit pressure, the pressure Pc is corrected to the lower limit pressure (at Step S32). Then the control goes from Step S32 to S33.

It is judged at Step S33 whether a difference between the present target engaging operational pressure Pc(p) and the former target engaging operational pressure Pc(f) calculated at Steps S31,S32 i.e. a change $\Delta$ Pc (actually absolute value |$\Delta$Pc|) in the target engaging operational pressure is within a range specified by a specified lower limit value (which is a negative value) and a specified upper limit value (which is a positive value). If the change $\Delta$ Pc is a negative value lower than the lower limit value (negative), the present target engaging operational pressure Pc(p) is corrected to a pressure calculated by adding the lower limit value to the former target engaging operational pressure Pc(f) at Step S34. If the change $\Delta$ Pc is a positive value higher than the upper limit value (positive), the present target engaging operational pressure Pc(p) is corrected to a pressure calculated by adding the upper limit value to the former target engaging operational pressure Pc(f) at Step S34. If the change $\Delta$Pc is within the range specified by the lower and upper limit values, the present target engaging operational pressure Pc(p) is maintained as it is (Step S35). Then, the control goes to Step S41.

At Step S41, an electric current required for the clutch control valve 75 to exert the target engaging operational pressure Pc therefrom is sent to the solenoid provided on the valve 75. Then, the memorized value for the target engaging operational pressure Pc is renewed at Step S42.

Figure 7:
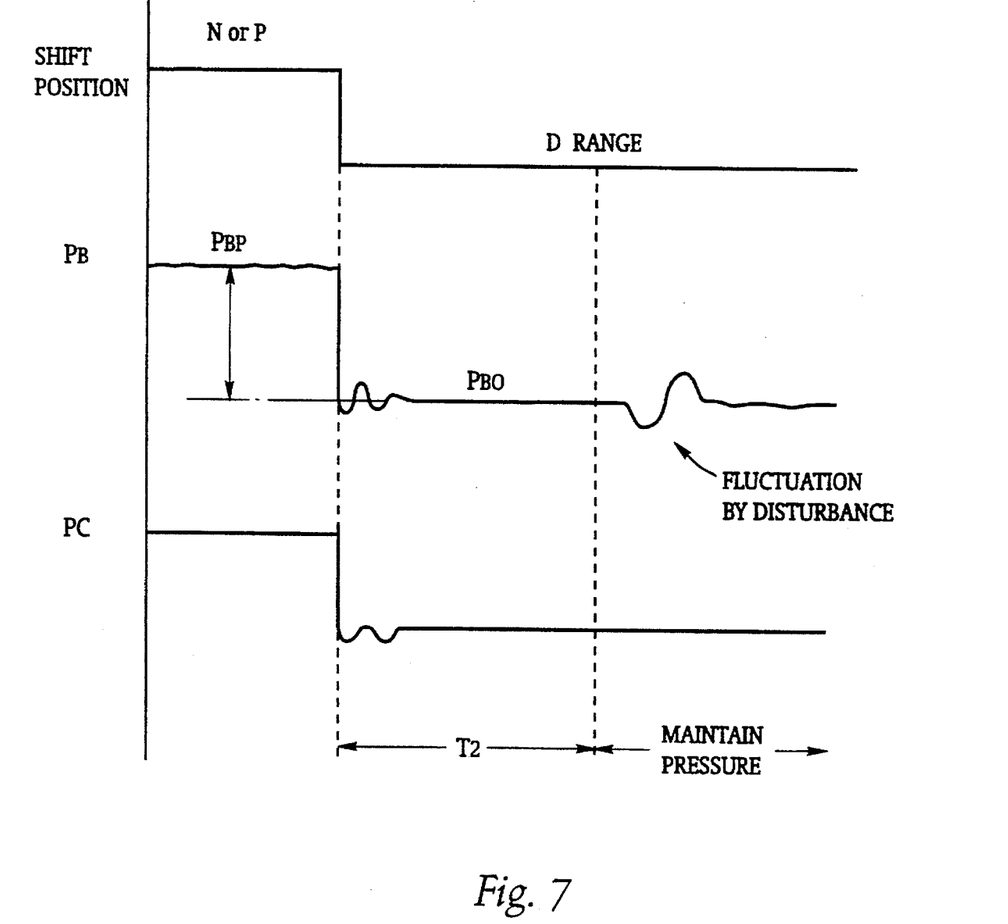
FIG. 7 is a graph showing the relationships among the changes of a shift position, $P_B$ and Pc.

The relationship between the intake vacuum pressure $P_B$ and the target engaging operational pressure Pc under the intake vacuum feedback mode M4 are shown in FIG.7. As shown in FIG.7, when shifted from N or P-range to D-range (or when the shift position is changed from N or P-range position to D-range position), a target intake vacuum pressure $P_{BO}$ required to produce the weak creep force is set based on the actual intake vacuum pressure $P_{BP}$ existing immediately before the shift to D-range (Steps S11 to S16). Then, a feedback control of the target engaging operational pressure Pc by the clutch control valve 75 (or a feedback control of the electric current supplied to the solenoid of the control valve 75) is carried out so that the actual intake vacuum pressure $P_{BA}$ approaches the target intake vacuum pressure $P_{BO}$ after shifted to D-range. As a result, the engaging operational pressure Pc supplied to the starting clutch 5 is controlled so that the actual intake vacuum pressure $P_{BA}$ coincides with them target intake vacuum pressure $P_{BO}$. Accordingly, in spite of the variation in the frictional coefficient of facing material of the starting clutch 5, a stable weak creep force can be transmitted to the drive wheels to prevent an unfavorable vibration of the vehicle and to improve the fuel consumption of the engine. Further, since the feedback control is carried out based on the engine intake vacuum pressure which is directly related to the engine load, the required engaging operational pressure for the starting clutch to keep a desired creep force (the weak creep force) can be calculated and controlled easily.

The intake vacuum pressure feedback mode M4 is carried out for a specified time period T2. Then, the feedback control is canceled and the engaging operational pressure Pc (or the electric current supplied to the solenoid of the clutch control valve 75) is maintained as shown in FIG.7. Accordingly, in this mode, even if the engine load is fluctuated by a disturbance caused by operations of the radiator fan, power steering pump, alternator etc., a constant weak creep force will be transmitted to the drive wheels.

When the control goes to Step S6 in FIG.3, the normal creep mode M5 is selected. In the normal creep mode MS, a specified pressure is set as a target engaging operational pressure Pc. The specified pressure is determined by adding a predetermined value to the target engaging operational pressure $P_{BO}$ calculated and memorized in the intake vacuum pressure feedback mode M4. Then, an electric current to produce the specified pressure is supplied to the solenoid of the clutch control valve 75. As a result, the engaging force of the starting clutch 5 is increased to transmit a higher creep force (normal creep force) to the drive wheels.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch operational control apparatus for controlling an engaging force of a clutch provided in a power transmitting path from an engine through an automatic transmission to drive wheels with the power transmitting path being controlled by the clutch, comprising;

idling state detecting means for detecting whether the engine is in an idling state;

vacuum pressure detecting means for detecting an actual intake vacuum pressure of the engine;

range judging means for judging whether a shift position of a manual shift means of the automatic transmission is in one of a driving-range and a non-driving range;

target intake vacuum pressure determining means for determining a target intake vacuum pressure based on the actual intake vacuum pressure when said range judging means judges that the shift position is in the non-driving range and further when said idling state detecting means detects that the engine is in the idling state; and clutch engaging force control means for controlling the clutch engaging force so that the actual intake vacuum pressure coincides with the target intake vacuum pressure when said range judging means judges that the shift position is in the driving range and further when said idling state detecting means detects that the engine is in the idling state.

2. A clutch operational control apparatus according to claim 1 wherein, said target intake vacuum pressure determining means determines said target intake vacuum pressure by subtracting a specified value from said actual intake vacuum pressure.

3. A clutch operational control apparatus according to claim 1 wherein, said actual intake vacuum pressure is detected immediately before the shift from the non-driving range to the driving range.

4. A clutch operational control apparatus according to claim 1 wherein, when shifted from the non-driving range to the driving range, at first said clutch engaging force control means controls the clutch engaging force for a specified time period so that the actual intake vacuum pressure coincides with the target intake vacuum pressure, and then the clutch engaging force is kept constant at a value determined at the end of said time period.

5. A clutch operational control apparatus for controlling an engaging force of a clutch provided in a power transmitting path from an engine through an automatic transmission to drive wheels with the power transmitting path being controlled by the clutch, comprising;

idling state detecting means for detecting whether the engine is in an idling state;

braking operation detecting means for detecting whether a vehicle brake is applied;

vacuum pressure detecting means for detecting an actual intake vacuum pressure of the engine;

range judging means for judging whether a shift position of a manual shift means of the automatic transmission is in one of a driving range and a non-driving range;

target intake vacuum pressure determining means for determining a target intake vacuum pressure based on the actual intake vacuum pressure when said range judging means judges that the shift position is at the non-driving range and further when said idling state detecting means detects that the engine is in the idling state;

creep-mode selection means for selecting a first creep-mode when said range judging means judges that the shift position is in the driving range and further when by said braking operation detecting means detects that the vehicle brake is not applied, and for selecting a second creep-mode when said range judging means judges that the shift position is in the driving range and further when said braking operation detecting means detects that the vehicle brake is applied;

the creep force transmitted through the clutch being larger in said first creep-mode than in said second creep-mode; and clutch engaging force control means for controlling the clutch engaging force so that the actual intake vacuum pressure coincides with the target intake vacuum pressure when said second creep-mode is selected by said creep mode selection means.

6. A clutch operational control apparatus according to claim 5 wherein, said target intake vacuum pressure determining means determines said target intake vacuum pressure by subtracting a specified value from said actual intake vacuum pressure.

7. A clutch operational control apparatus according to claim 5 wherein, said actual intake vacuum pressure is detected immediately before the shift from the non-driving range to the driving range.

8. A clutch operational control apparatus according to claim 5 wherein, when shifted from the non-driving range to the driving range under said second creep-mode, at first said clutch engaging force control means controls the clutch engaging force for a specified time period so that the actual intake vacuum pressure coincides with the target intake vacuum pressure, and then the clutch engaging force is kept constant at a value determined at the end of said time period.

9. A clutch operational control apparatus according to claim 5 wherein, when said first creep-mode is selected, said clutch engaging force control means controls the clutch engaging force so as to coincide with a predetermined engaging force.

10. A clutch operational control apparatus according to claim 9 wherein, said predetermined engaging force is determined by adding a specified value to the engaging force determined in said second creep-mode.

* * * * *